United States Patent [19]

Panetti

[11] Patent Number: 5,101,358
[45] Date of Patent: Mar. 31, 1992

[54] METHOD OF PROGRAMMING AND PERFORMING THE REPROFILING WORK OF RAILS OF A RAILROAD TRACK AND A DEVICE TO CARRY OUT THE SAME

[75] Inventor: Romolo Panetti, Geneva, Switzerland

[73] Assignee: Speno International S.A., Geneva, Switzerland

[21] Appl. No.: 560,573

[22] Filed: Jul. 31, 1990

[30] Foreign Application Priority Data

Aug. 28, 1989 [CH] Switzerland .................. 3115/89

[51] Int. Cl.$^5$ .................. G06F 15/46; E01B 31/17
[52] U.S. Cl. .................. 364/474.21; 364/474.15; 51/178; 51/165.71
[58] Field of Search .......... 364/474.21, 150, 472, 364/474.13, 474.15; 51/178, 165.70, 165.71; 73/636

[56] References Cited

U.S. PATENT DOCUMENTS

| | | | |
|---|---|---|---|
| 4,091,578 | 5/1978 | Panetti | 51/178 |
| 4,115,857 | 9/1978 | Panetti | 364/474 |
| 4,417,466 | 11/1983 | Panetti | 73/105 |
| 4,531,837 | 7/1985 | Panetti | 356/376 |
| 4,541,182 | 9/1985 | Panetti | 33/560 |
| 4,596,092 | 6/1986 | Panetti | 51/178 |
| 4,862,647 | 9/1989 | Vieau | 51/178 |
| 4,896,460 | 1/1990 | Theurer et al. | 51/178 |
| 4,905,422 | 3/1990 | Panetti | 51/178 |
| 4,920,701 | 5/1990 | Panetti | 51/165.71 |
| 5,020,371 | 6/1991 | Panetti | 73/636 |

FOREIGN PATENT DOCUMENTS

| | | |
|---|---|---|
| 0114284 | 8/1984 | European Pat. Off. |
| 633336 | 11/1982 | Switzerland |
| 654047 | 1/1986 | Switzerland |
| 655528 | 4/1986 | Switzerland |
| 666068 | 6/1988 | Switzerland |

Primary Examiner—Jerry Smith
Assistant Examiner—Paul Gordon
Attorney, Agent, or Firm—Young & Thompson

[57] ABSTRACT

A method for programming the work of reprofiling the rails of a railroad track, and/or for reprofiling the rails, and an apparatus to carry out this method is disclosed. The method is simple, precise, entirely automatic, and rapid and thus avoids interference with normal rail traffic. The method comprises dividing the track into a certain number of portions, and carrying out several steps on each portion. The method which permits the simultaneous use of diverse advanced techniques for measuring the profile, may be carried out immediately or be differed to a later time.

11 Claims, 8 Drawing Sheets

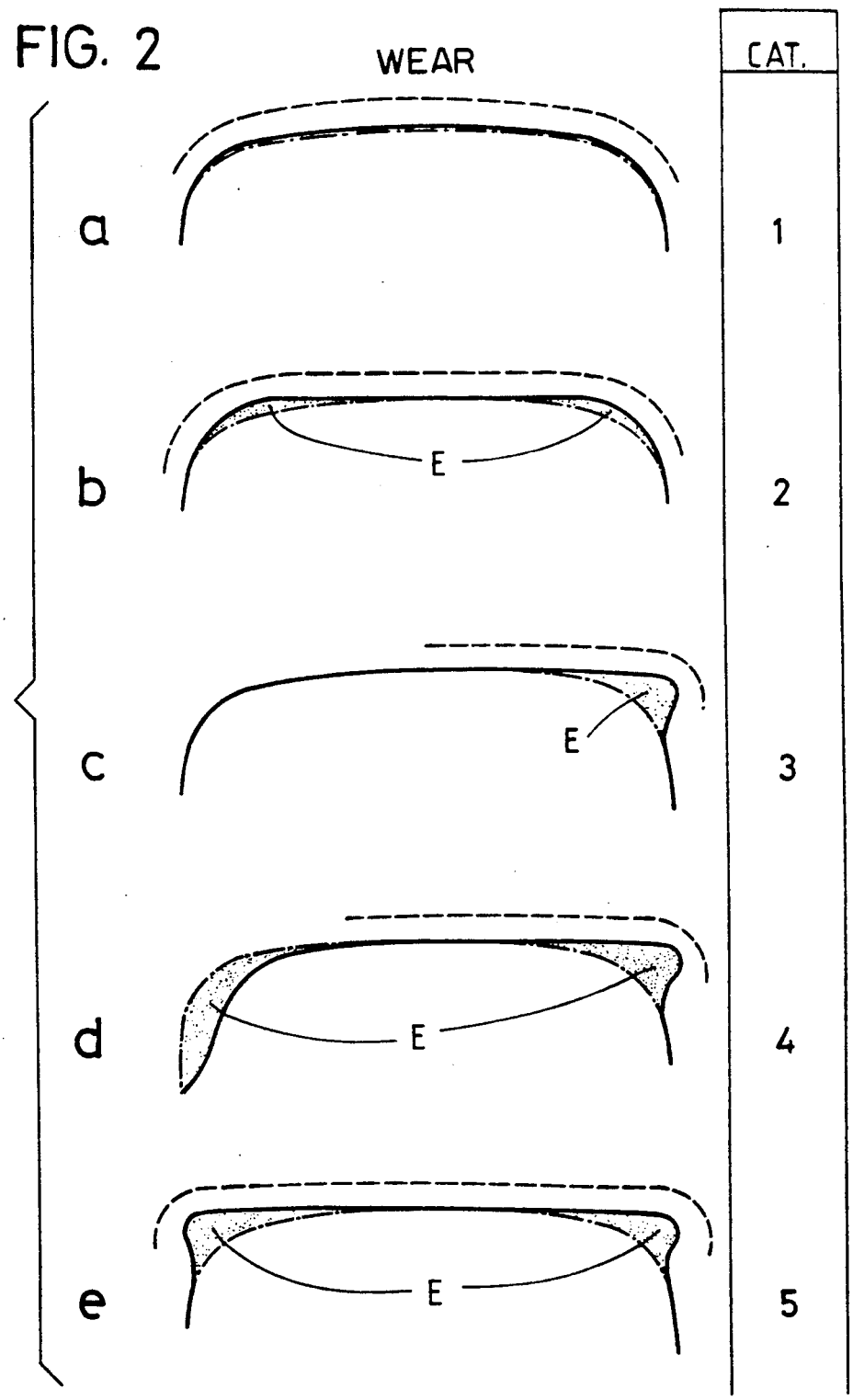

PK: 102.500 TO 102.550      $L_o = 50$ m.

| LEFT RAIL | | RIGHT RAIL |
|---|---|---|
| 3 | CATEGORY | 5 |
| 36 | DISTRIBUTION N° | 58 |
| 30 | INTENSITIES N° | 51 |
| 0.32 | AMPLITUDE OC | 0.37 |
| 1.18 | AMPLITUDE OL | 1.24 |
| AGGRESSIVE BLOCKED | GRINDING MODE | AGGRESSIVE BLOCKED |

FIG. 4

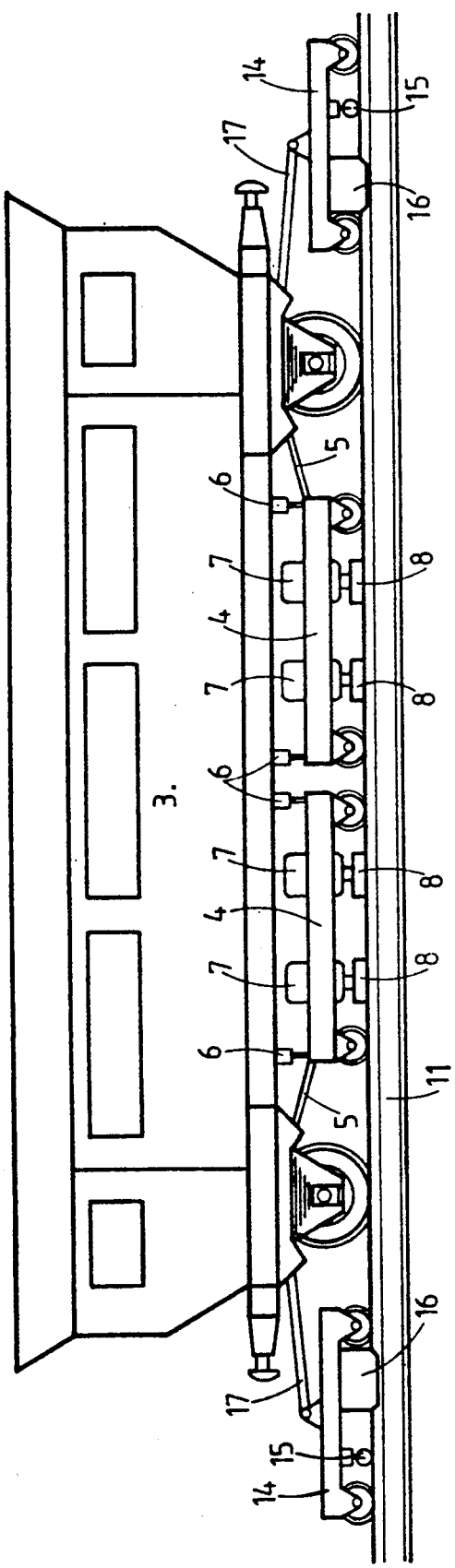
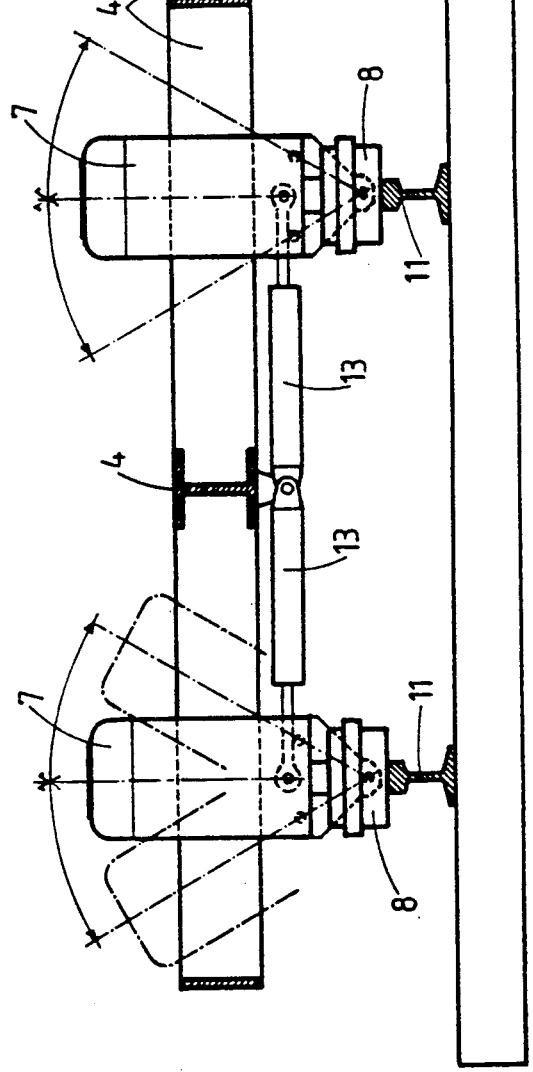
FIG. 5
FIG. 6

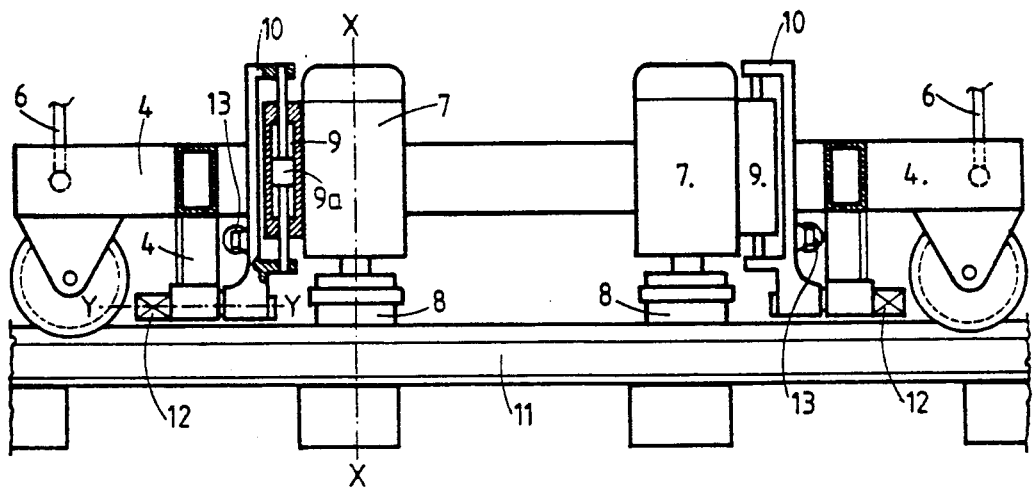
FIG. 7
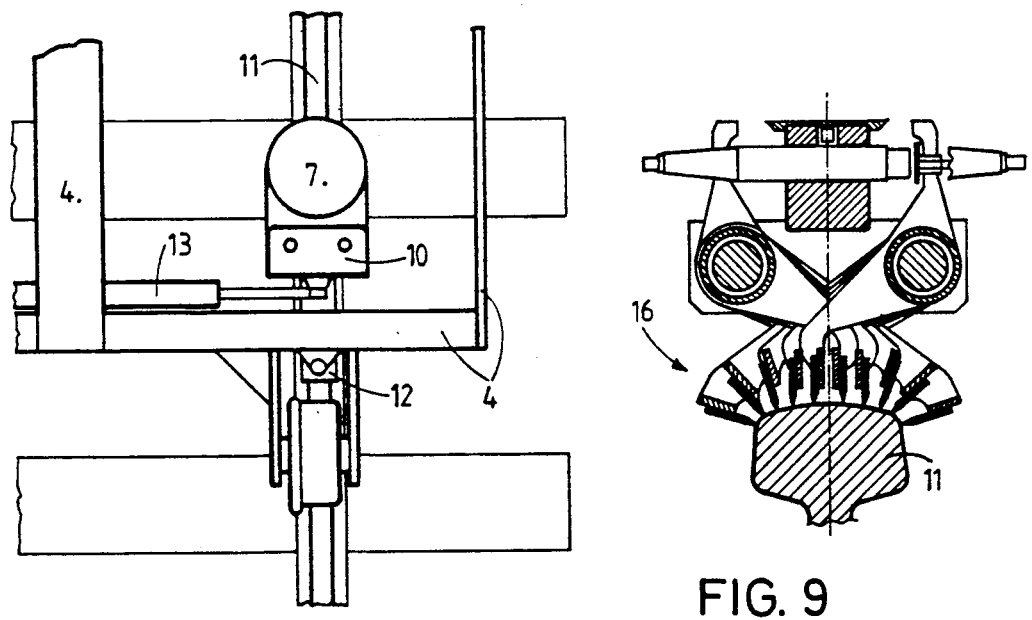
FIG. 8
FIG. 9

METHOD OF PROGRAMMING AND PERFORMING THE REPROFILING WORK OF RAILS OF A RAILROAD TRACK AND A DEVICE TO CARRY OUT THE SAME

FIELD OF THE INVENTION

The use of modern high-speed trains necessitate tracks and rails of better quality, that is to say having the least possible defects, and this necessitates a more frequent verification and reprofiling of the rails. However, this verification and this reprofiling of the rails of a railroad track are always more difficult to make due to the increase of the frequency of the trains and therefore of the occupation level of the track, which is always increasing.

It is therefore necessary to be able to program in advance and with a sufficient precision the reprofiling of the rails of a track and to know particularly the time necessary for such a reprofiling. It is of course wishful that the datas used for said programming of the reprofiling work may also be used to control a reprofiling vehicle of the rails of a track in order to optimize these operations and to avoid any useless operation or work to be done twice.

SUMMARY OF THE INVENTION

The present invention has the aim of the elaboration of a programming method of the work for reprofiling rails of a railroad track and/or for reprofiling these rails, which is simple, precise, entirely automatic and thus rapid. The invention has also the aim of the realization of a device to carry out this method.

The method according to the present invention is defined by the fact that one divides the track in a certain number of portions and that for each of said portions one proceeds for each line of rails, to the following operations:

a. one selects among several reference profiles a preferred reference profile;
 b. one determines a certain number of characteristical wearing off types of the rail to be reprofiled among given wearing off types.
 c. one selects the type of machine having to be used for the reprofiling among the types of machine at disposition, as well as the speed of working;
 d. one defines the standard tool configurations as well in position as in power;
 e. one selects as a function of the type of reprofiling machine to be used, the standard tool configurations which can be realized with said machine;
 f. one measures the length and/or the amplitude of the longitudinal undulations on the track portion envisaged;
 g. one measures the transverse profile of the head of the rail on the envisaged track portion;
 h. one compares the measured rail profile with the preferred reference profile and determines the excess of metal to be removed;
 i. one compares the measured transverse profile of the rail to the different possible wearing off types and determines by this comparison the reprofiling category to be used which is representative for the considered portion.
 j. one determines as a function of the representative reprofiling category the standard particular tool configuration to be used among the ones selected for the machine to be used;
 k. one determines as a function of the particular tool configuration to be used, of the reprofiling category to be used, of the excess metal to be removed and of the longitudinal undulations amplitude, the total number of passes to be made.

The device according to the invention is defined by the fact that it comprises selection means of a preferred reference profile among several reference profiles which are memorized; means to determine among all the memorized and detected types of waring off a certain number of characteristical types of wearing off as the worn rail to be reprofiled; means to define the speed of work; means to memorize all the possible standard configurations of tools for this machine; means to measure the length and/or the amplitude of the longitudinal undulations of the rails; means to measure the transverse profile of the head of the rail; comparison means of the worn rail profile with the preferred reference profile to determine the excess metal to be removed; comparison means of the measured transverse profile to the different characteristical types of wearing off of the rail to be reprofiled to determine the reprofiling category to be used; means determining as a function of the reprofiling category to be used, the particular standard tool configuration to be used; means determining as a function of the tool configuration to be used, of the reprofiling category to be used, of the excess of metal to be removed and of the amplitude of the longitudinal undulations, the total number of passes to be made.

BRIEF DESCRIPTION OF THE DRAWINGS

The attached drawing shows schematically and by way of example different steps or operations of this method as well as a reprofiling machine to carry it out.

FIG. 2 shows schematically for each type of wearing off a, b, c, d and e of the head of the rail the quantity and the position of the metal to be removed defining the wearing off category of the rail and a schematic distribution of the reprofiling tools which is to be used.

FIG. 4 shows a display mode of the different parameters necessary for the programming and the control of the reprofiling of a portion of the track.

FIG. 5 shows a lateral side view of a reprofiling vehicle.

FIGS. 6 to 8 show details of the vehicle shown at FIG. 5.

FIG. 9 shows a detail of a measuring device.

DETAILED DESCRIPTION OF THE INVENTION

Figure 1:
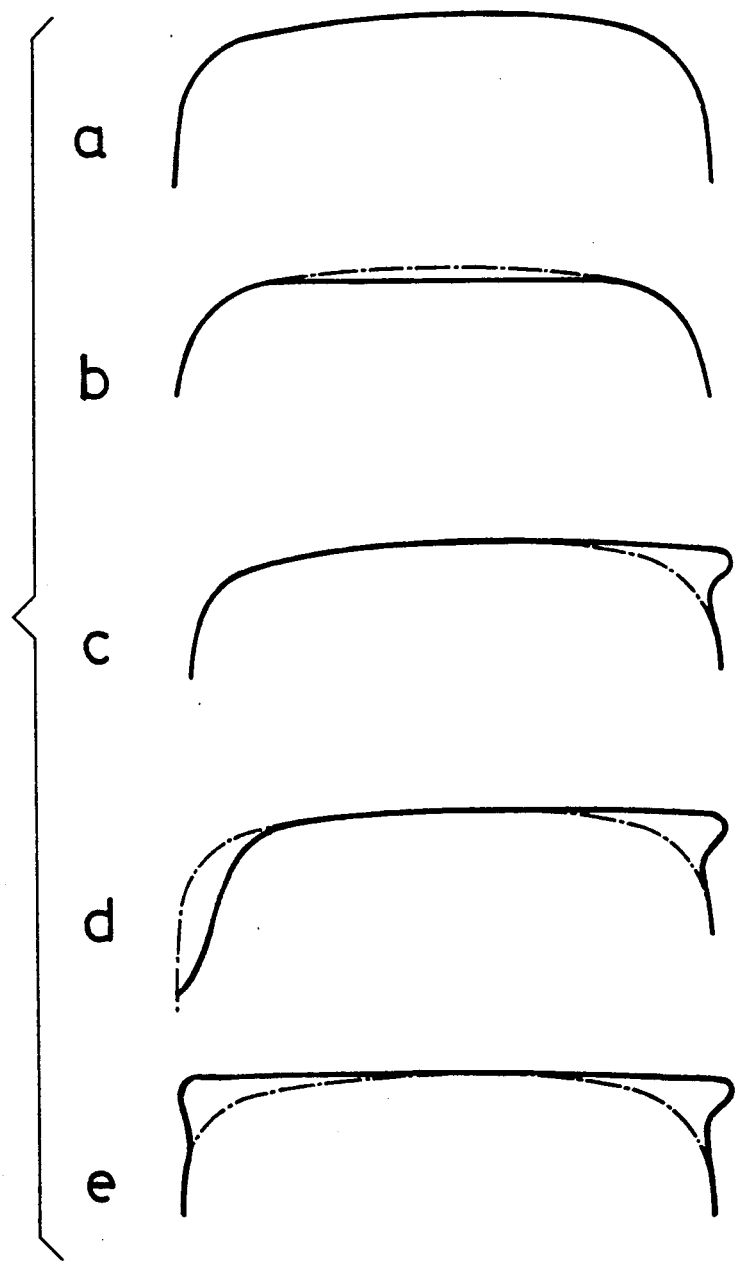
FIG. 1 shows different types a, b, c, d and e of wearing off of the head of the rail of a railroad track.

Experience has shown that the deformations of the transverse profile of the head of the rails of a railroad track take, according to the type of traffic and to the load of the trains which circulate on said track, characteristical type of wearing off which is possible to classify as shown at FIG. 1.

The shape of the transverse profile shown in a corresponds to a first type of wearing off relative to a normal rail which is less or practically not worn off.

The shape of the transverse profile shown in b corresponds to a second type of wearing off relative to a flattened rail the sides of which are still usable.

The shape of the transverse profile shown in c corresponds to a third type of wearing off relative to a rail having an important outside burr.

The shape of the transverse profile shown in d corresponds to a fourth type of wearing off relative to a rail presenting an outside burr and an inside chamfer.

The shape of the transverse profile shown in e corresponds to to a fifth type of wearing off relative to a flat rail presenting outside and inside burrs.

Experience shows that all the rails worn by the circulation of trains can be classified in the one or the other of the characteristical types of wearing off.

Furthermore, knowing for each railroad track the type of rails lead and the nature of the traffic, high-speed trains or on the contrary heavy loaded merchandise trains, one knows by experience which is the optimum transverse profile of the head of the rail to guarantee the best us of the railroad track. This optimal profile is not necessarily the original transverse profile of the head of the rail but may be an average or mean wearing off profile realizing an optimum between the rolling conditions of the trains and the conditions or frequencies of the reprofiling of the rails.

Therefore, in a general manner, it is possible for each track or each portion of railroad track, to define by experience or empirically a reference profile which the rectifying operations or reprofiling operations of the rails aim to restore or create at the layout of new rails, this particularly for the railroad track having a high-speed traffic.

Comparing the transverse reference profile of the head of a rail of a portion of railroad track to the type of worn of profile, one determines which are the zones of the head of the rail which have to be reprofiled, that is where there is an excess of metal, as well as the importance of these zones, that is the quantity of metal to be removed.

As a function of said comparison of the reference profile with the type of wearing off of a rail, experience and practice have permitted to determine the categories of reprofiling. Each of these reprofiling categories corresponds to a standard configuration of the reprofiling tools that is to say a particular distribution of them around the head of the rail and a power or applying force against the rail of each tool. These standard tool configurations depend of course also on the number of tools for each line of rails which the machine or rectification vehicle used possesses, and on all the characteristics of these tools.

FIG. 2 shows, by means of the comparison of the wearing off types represented at FIG. 1 with a chosen reference profile, the reprofiling category to which one is confronted in a particular case, and in dashed lines the tool distribution around the head of the rail.

In a the comparison of the reference profile with a worn rail according to the first type (FIG. 1a) determines a first category of reprofiling for which the tools of the reprofiling machine will be regularly distributed around the profile of the head of the rail with a pressure against the rail which is reduced and which is somewhat regular.

In b the comparison of the reference profile with a rail worn according to the second type of wearing off (FIG. 1b) determines a second reprofiling category for which the tools are concentrated on the outside and inside sides with a resting pressure which is determined by the amplitude of the excess E of metal to be removed.

In c the comparison of the reference profile with a worn rail according to the third type of wearing off (FIG. 1c) determines a third category of reprofiling for which the tools are concentrated on the outside portion of the rolling table and on the outside side of the rail, with a resting pressure which is notably higher on the tools affected to the outside side.

In d the comparison of the reference profile with a worn rail according to the first type of wearing off (FIG. 1d) determines a fourth category of reprofiling for which the tools are concentrated on the rolling table and on the outside side of the rail with a resting pressure which is higher on the tools affected to the outside side.

In e the comparison of the reference profile with a worn rail according to the fifth type of wearing off (FIG. 1e) determines a fifth category of reprofiling for which the tools are concentrated on the outside and inside sides with resting pressure which are important.

From the elements thus developed and determined through experience, it is possible to describe the original method of programming of the reprofiling or profiling works of the rails of a railroad track and/or for the execution of this profiling or reprofiling, description which, to facilitate the comprehension, will be made in relation with the diagramm of FIG. 3a.

According to the configuration of the track the reprofiling of which has to be programed or made, said track is divided in unitary portions of a length Lo. This reference length Lo and the different reference profiles which can be used are stored in 2 under the form of a matrix for example. One selects among the reference profiles stored as a 2, in function of the track or of the portion of track to reprofile, the preferred reference profile which is to be used and this one is stored in 3. One stores in 6, under the form of a matrix for example, all the different types of wearing off for example the one defined before (FIG. 1), for each reference profile. One selects among these types of wearing off, the one corresponding to the preferred reference profile and these are stored in 4.

A detector 5 mounted on a wheel of the reprofiling machine delivers signals corresponding to the position of said machine on the track, i.e. the kilometric point where said machine is.

To program or to control the reprofiling work one determines, as a function of the length of the track to treat and of the time which is at disposition, the most appropriate speed for each portion Lo of the track; these speeds relative to each portion Lo are stored in 7.

One knows also the type of machine which will be used for the profiling or the reprofiling of a given track and this indication, including particularly the number and the type of reprofiling tool, as well as, their characteristics which said machine comprises for each line of rails is stored in 8.

One stores in 9 all the tool configurations, their distributions around the head of the rail and their characteristics, for all the types of reprofiling machine stored in 8.

The type of machine which will be used for the reprofiling being defined, one displays and stores in 10 the number of tools N and one selects the standard configuration of tools proper to said machine which can be used for the reprofiling and/or be memorized in 11.

One has further two supplementary informations, either by measures made before on the track to be reprofiled or by measures made in real time by the programming machine or by the reprofiling machine. On one hand, one has the measure of the transverse profile of the head of the rail in 12 and on the other hand the measure of the depth and of the length of the undulation waves of the rolling table of the rail in the longitudinal direction in 13. For example, one can indicate that the measure of the transverse profile can be done as described in the European Patent 0.114.284 and that the measure of the undulations can be made in the manner described in the European Patent 0.044.885.

For the measuring of the profile of the head of the rail, as well as, for the longitudinal undulations of the rail, it is often preferable to proceed by means of sampling. One determines in ,14 the distance X between two desired samples and memorizes these profile samples P and undulation amplitude samples h in 15 and 16 respectively.

At the end of each track portion $\Sigma x = Lo$, one causes by means of 17 the starting of the calculation in 18 of an average profile P on the distance Lo, i.e. $\bar{P}$ and in 19 the average undulation h along Lo, i.e. $\bar{h}$.

One can choose to calcute the average in different ways, for example the arithmetic average or the quadratic average.

For the determination of the average profile P, one can proceed in several ways One may for example take the average of all the measured profiles along Lo, $$P = \frac{X}{Lo} \Sigma$$

profiles, or take the average of the (n−2) profiles which are the closest to the reference profile by suppressing the two profiles which are the most spread apart, in order not to influence the average by extreme values.

By means of the average amplitude $\bar{h}$ of the longitudinal undulations of the rail and of the displacement speed pre-selected one determines, as a function of tables which are determined by the experience and memorized in 20 the number of passes necessary for the elimination of this undulatory deformation of the rail.

The average profile $\bar{P}$ for each portion of the track Lo is stored under the form of a matrix, for example, and compared in 21 to the preferred reference profile, or to the reference profile for this portion of track, and this enables to determine the excess of metal E to be taken off to reprofile the rail.

To define the reprofiling category one compares sequentially in 22 the different wearing off types $i = 1$ to 5 with the average profile $\bar{P}$ that is $(\bar{P} - \text{type } i) = Vi$. The comparison giving the minimum of Vi determines the reprofiling category for the portion envisaged of the track and this one is memorized in 23.

One could also make the comparison of the types of wearing off with each of the profiles P taken all the "X" meters and determine for each of these profiles, the reprofiling category. The number of the category of reprofiling which occurs the more frequently on the portion Lo would then be considered as the one of the reprofiling category which is representative for that portion Lo.

Furthermore by means of tables determined by the experience and stored in 24, one defines from the excess of metal E, the preselected working speed V and the reprofiling category CAT, the number of necessary passes for the rectification of the transverse profile of the rail. This number of passes necessary to eliminate the defects of the transverse profile is added in 25 to the number of passes necessary to eliminate the undulatory defects of the portion Lo of the track, and thus, one obtains the total number of passes necessary to reprofile the rail, which total number of passes is also displayed and memorized in 10.

Knowing the category of reprofiling and the total number of passes enables to select in 11 the optimal configuration of the tools, in position and power, which best corresponds for a given machine to the reprofiling of the types of off affecting the portion Lo of the track. This configuration CONF of tools is displayed and memorized in 10.

The wavelength of the longitudinal undulations is determined in 26. Knowing this wave length, the total number of passes and the a amplitude h of these undulations one determines as a function of the experimental datas memorized in 27 the mode, light or aggressive; free or locked, and this grinding mode is also displayed and memorized in 10.

For the short waves (3 to 30 cm) of low amplitude for example $\bar{h} \leq 0.15$ mm the grinding mode will be light; for values of $\bar{h} \geq 0.15$ the mode will be the aggressive one. For the long waves (from 0.3 to 3 m) and of an amplitude $\geq 0.5$ mm for example the grinding units will be locked together to increase the rectilinear reprofiling reference base, for amplitudes $\leq 0.5$ mm these units will be free. The different soils causing the change of mode are fixed in 27. The soils defining the change of mode can be chosen by the operator and introduced in 27. The grinding mode is determined and displayed and memorized in 10.

For each portion of track Lo, one can with the aid of the displayed and memorized datas in 10 record the necessary parameters for the control of a reprofiling machine, and store them in 28 for a reprofiling which will be done later on. It is also possible to use the displayed and memorized datas in 10 directly for the control of a reprofiling device 29. Finally, a third mode of operation would be to use the datas displayed in 10 to manually program through an operator a reprofiling machine.

Therefore, according to the method described the knowledge for each portion of track Lo of a railway track, the type of reprofiling machine, its working speed V, the average profile $\bar{P}$, the excess of metal E, the average amplitude $\bar{h}$ and the length of the undulations for each line of rails enables to define for each of these portions of track:

The total number of passes to be made.
The reprofiling tools configuration, that is their distribution around the head of each line of rails, as well as their power or resting pressure against the rail.
The grinding mode to be used.

These parameters which uninacally define the reprofiling of the rails of a railroad track can be successively recorded for each of the portions Lo of railroad track as a function of the curvilinear abciss of the track on an appropriate, support, preferably a magnetic or optical support. They can be displayed for example in the manner shown at FIG. 4 or used for the direct control of a reprofiling machine, either manually or automatically.

So, for each portion of track of a length of 50 m for example, one visualizes immediately the kilometric position of the portion of track, and for each line of rails under a graphic representation, the comparison of the preferred reference profile with the worn rail profile, and under a numerical form, the reprofiling category, the configuration in position of the grinding units, the power configuration of the grinding units, the amplitude of the longitudinal waves as well as the grinding modes.

Other parameters such as the number of tools, the working speed of the machine, the mode of rectification, the kilometric point, the number of the track portion, the average height as well as the wave length of the longitudinal undulations can also be recorded from the datas displayed and memorized in 10 and be used principally for the information of the operator.

To better show the simplicity of use of the method according to the present invention, we shall give hereunder a possible presentation of a record corresponding to determined portions of track and explain briefly their use.

appropriate support, particularly as a function of the occupation of said track. This work can be effectuated by a department or specialized office before the reprofiling which is itself performed at the best moment as a function of the use of the track.

Columns 4,5 and 9,10 of this diagram are informative for the operator and enable him, when the reprofiling work is done to control its quality.

Finally columns 2,6,7,8 and 11,12,13 of the diagram contain informations necessary for the programming of the work for reprofiling and for controlling the reprofiling machine. As seen before, these datas can be used directly for the automatic programming or immediate manual programming of a reprofiling machine, they can also be memorized and used later on for the automatic or manual programming of the reprofiling machine.

This reprofiling programming method or profiling programming method of the rails of a railroad track and/or their immediate or differed reprofiling is particularly interesting since, for the first time, it permits the

| Line: GENEVE-LAUSANNE Track: 2 Rail: UIC 60–90 A Date: Machine: RPS-32/16 Tools/file - Tool No 602-ac 90A/Time at disposition: 2h | | | | | | | | | | | | | | |
|---|---|---|---|---|---|---|---|---|---|---|---|---|---|---|
| | | | Left Rail | | | | | | Right Rail | | | | | |
| Kilometric point P.K. | Speed km/h V | Machine Passes P.M. | Category CAT. | Undul. moy Y | Distrib. Tools DIST. | Tool Power Puis. | Mode | CAT | Y | DIST. | PUIS. | Mode | lo |
| 35.500 | 5 | 2 | 3 | 0.3 | 425 | 412 | A | 4 | 0.25 | 420 | 415 | A | 100 |
| 35.600 | 5 | 2 | 4 | 0.3 | 318 | 309 | A | 2 | 0.35 | 230 | 225 | A | 100 |
| 1 | 2 | 3 | 4 | 5 | 6 | 7 | 8 | 9 | 10 | 11 | 12 | 13 | 14 |

This record shows:
The datas belonging to the track, i.e :
  The occupation of the track, that is the time which is available for the reprofiling of the rails.
  The type of rails lead and the quality of their steel.
  The portion Lo which is considered from the track of which one knows the shape and the own characteristics.
  The reference profile to be used, as well as, the different types of wearing off which are associated with it.

The datas relating to the reprofiling machine, i.e. :
  The type of machine used for the reprofiling work.
  The number of tools for each line of rails.
  The type of tools of the machine with their characteristics, particularly in power and in metal cutting for the given steel type.
  The standard tool configurations which are possible for said machine and for the different grinding categories.

The datas referring to the reprofiling and which depend from the geometrical state of the rails to be reprofiled:
  the optimal advancement speed.
  the total number of passes necessary.
  the representative reprofiling category.
  The average amplitude of the longitudinal undulations, as well as, eventually as it will be seen later the short or long wavelength.
  the distribution of the tools around the head of the rail.
  the power of each tool or its resting force against the rail.
  the reprofiling modes.

Columns 1,2,3 and 14 of the diagram given hereinabove enable, taken alone, the general programming of the reprofiling of the track and its memorization on an simultaneous use of diverse advanced technics for the measurement of the real profile, for their reprofiling, particularly with the aid of sophisticated grinding units such as the one described in patent CH 633.336; CH 654.047; CH 666.068; CH 655.528 and the patent application CH 812/88 in combination with the know-how acquired by operating teams through numerous years of practice on a great quantity of railroad networks in numerous countries.

This method has been rendered possible only due to the observation, the systematic measurement and recording of all the intervening parameters in the reprofiling, then to the definition of the rules governing the different parameters between them, and further through the storing under the form of matrix, which are directly usable of the said different parameters.

It became then possible to use while adopting the most advanced technics, all the acquired experience by the best user in order to entirely and automatically control the reprofiling machine, control which is more rapid, more precise and above all avoids any human error, either of the appreciation of the precise case, or of the execution which is always possible.

This automatic method is very simple to use, it conforms to the logic of the operators from which it is derived, and permits to greatly simplify the calculating systems and the control systems of the reprofiling machine by the use of standard configurations which are pre-established, and that it is sufficient to select. It permits as well the programming of the reprofiling in order to perform the work later on, or directly control the work of the reprofiling.

Figure 3A:
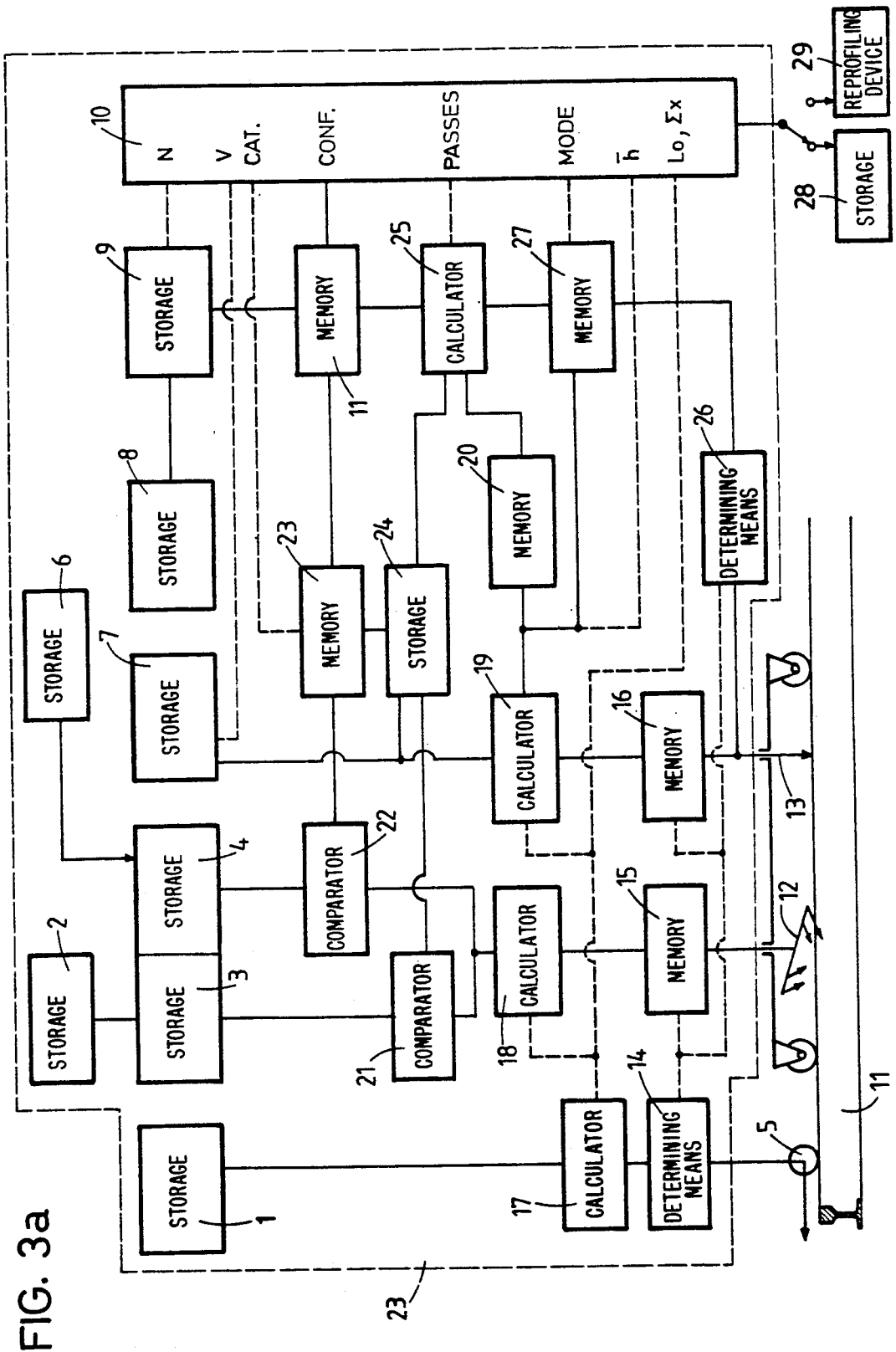
FIG. 3a shows under the form of a diagram or a bloc scheme the different operations of the method according to the invention and their succession.
Figure 3B:
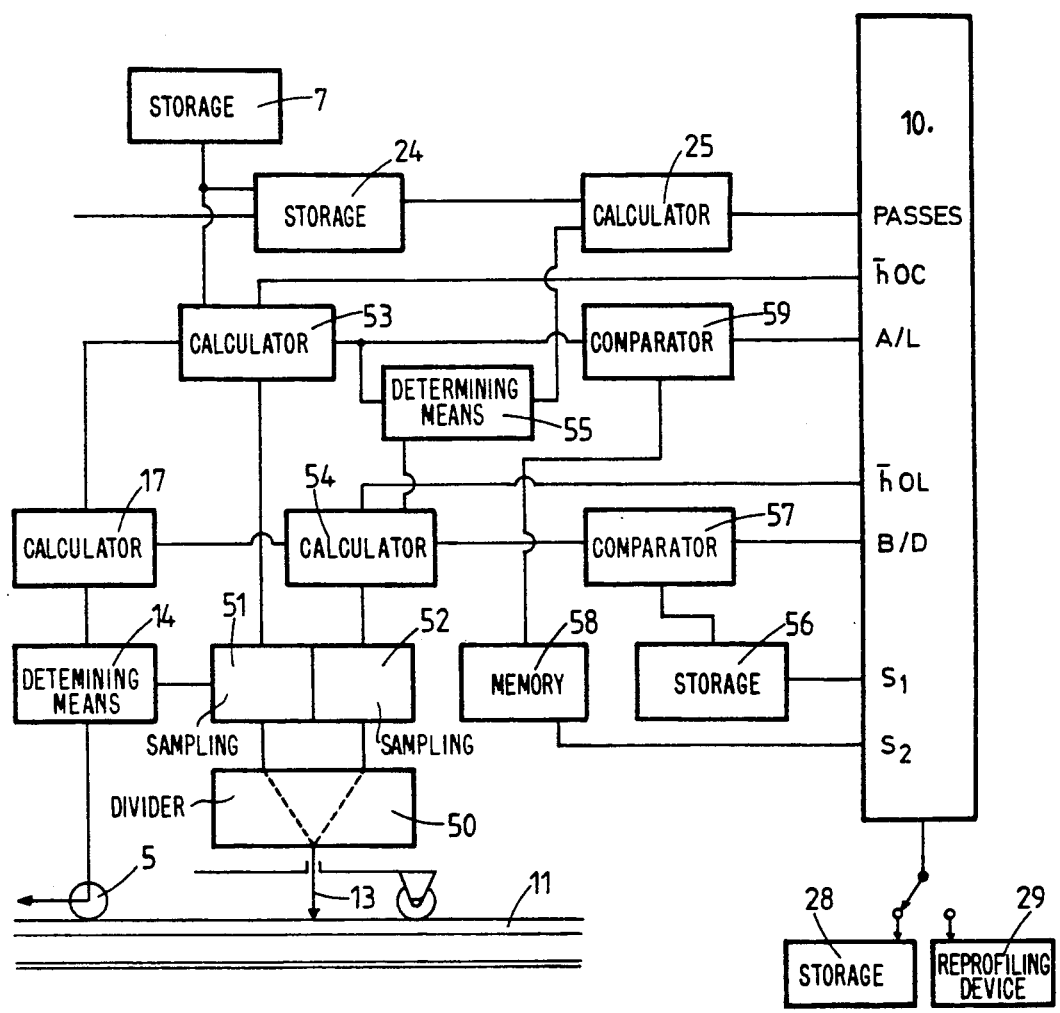
FIG. 3b shows a part of the scheme of FIG. 3a for a variant of the method.

FIG. 3b shows under the form of partial scheme a part of FIG. 3a for a variant of the method in which the longitudinal undulations of the rail of great wavelength are differently treated from the ones of short wavelength OC. These long and short waves are often superimposed on the track and therefore it is necessary to treat them separately which leads to the modification shown at FIG. 3b of the scheme of FIG. 3a previously described. The blocks or functions of the FIG. 3b which are in the scheme of FIG. 3a have the same reference ciphers for the simplicity of comprehension.

The feelers 13 of the amplitude of the undulations of the rail 11 give an information which is subdivided in 50 in signals corresponding to short waves OC, 3 cm to 30 cm, for example and in signals corresponding to long waves OL, 30 cm to 3 m for example. A sampling ensured by 14, is made all X meters in 51, 52 for the short waves OC and long waves OL respectively. In 53 one calculates the average of the amplitude of the short waves OC on the portion Lo whereas this calculation is effectuated in 54 for the long waves OL. The average amplitude of the long waves h̄OL and the one of the short waves h̄OC for the portion Lo is displayed and memorized in 10.

With the average h̄OC and the average h̄OL one determines by means of pre-registered tables in 55 the number of passes necessary for the elimination of the undulatory defects of the rail of the two types, OL, OC, number which is added as previously described in 26 to the number of necessary, passes to remove the defects of the transverse profile and which determines the total number of passes which is displayed and memorized in 10.

The average value of the amplitude of the long waves h̄OL is compared in 57 to a soil S1 pre-stored in 56 to determine the locked or free grinding mode according h̄OL being higher or lower than the soil S1. The locked mode B or unlocked mode D is displayed and memorized in 10.

The comparison of the average amplitude of the short waves hOC with the pre-established soil which is memorized in 58, made in 59, defines the aggressive A or light L grinding mode which is displayed and memorized in 10. The level of the soils S1 and S2 is also displayed and memorized in 10 for the convenience of the operator. The remaining of the scheme shown at FIG. 3a remains the same but with this variant one can define the grinding mode among four types, aggressive or light, locked or unlocked i.e. free or not and not only aggressive or light.

FIG. 5 shows seen from the side, a machine for the rectification of the rails cf a railroad track constituted by a motorvehicle 3 provided with grinding carriages 4. These carriages 4 are provided with flanged rollers resting, in working position, onto the rails of the track and are connected to the vehicle 3 on the one hand by means of a driving rod 5 and on the other, hand by means of lifting jacks 6. These jacks 6 enable not only the application of these carriages against the track but the lifting of the carriages for the high-speed running of the vehicle 3 for its displacement from one workstation to another grinding station.

Each grinding carriage 4 carries several grinding units for each line of rails, each of these grinding units comprises a motor 7 which drives in rotation a grinding wheel 8.

As particularly shown at FIG. 7, each grinding unit 7,8 is displaceable along its longitudinal axis X—X with respect to the carriage 4. In fact, the motor 7 carries the chamber 9 of a double-acting jack the piston 9a of which is fast with a rod, crossing the chamber 9, fast with a support 10. This support 10 is hinged on the carriage 4 around an axis Y—Y, parallel to the longitudinal axis of the rail 11. The angular position of the grinding units is determined and controlled by an angle detector 12 fast with the support 10 and a double-acting jack 13 connecting this support 10 to the carriage 4.

In this way each grinding unit is angularly displaceable around an axis parallel to the longitudinal axis of the rail with which it is perpendicularly associated This enables to displace the grinding wheels towards the rail and to apply the grinding unit against said rail 11 with a determined force, as well as to displace it away from said rail.

The vehicle 3 is further equiped with two measuring carriages 14 rolling along each rail equiped with a measuring device 5 of the longitudinal undulations of the surface of the rail 11 and with a device for the measuring of the transverse profile of the head of the rail. The carriages 14 are of course driven through the vehicle 3 for example by means of a rod 17. The device for measuring the transverse profile of the rails is shown schematically at FIG. 9 and is formed by an assembly of mechanical feelers in contact with different sidelines of the head of the rail (see Europan Patent 0.114.284).

The machine described comprises further (FIG. 10) a device for treating the datas delivered by the detectors 5 of the elapsed distance, 15 of the longitudinal undulations of the rail and 16 of the profile of the transverse profile of the rail and for controlling the reprofiling units 7,8 as well in position as in power to reprofile the rail 11 so as to give it a longitudinal and transverse profile identical or near to the reference profile which is affected to it.

Figure 10:
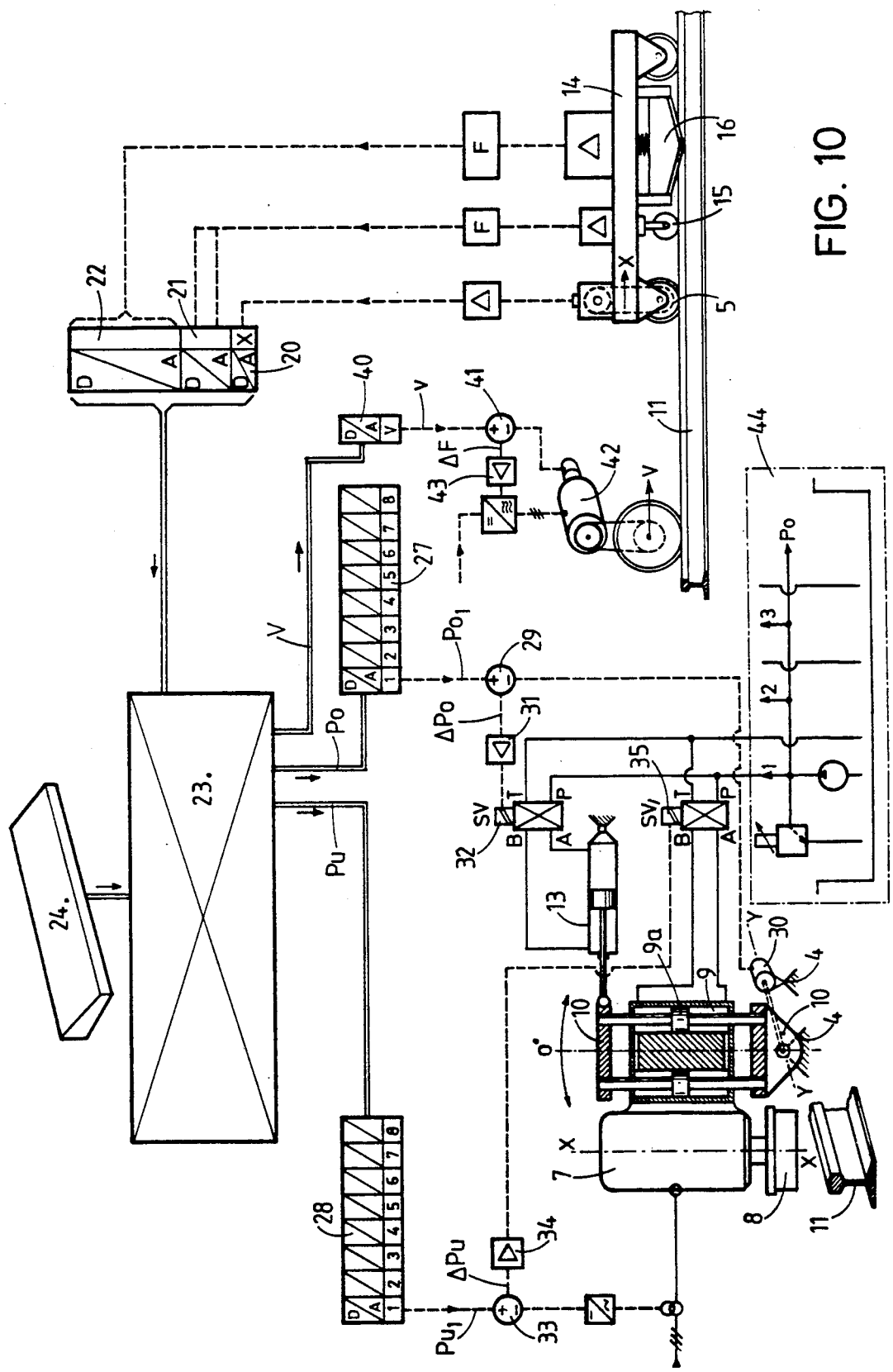
FIG. 10 is a scheme representing the control device of the grinding units of a reprofiling vehicle.

This handling device of the measuring signals and for controlling the reprofiling units is very schematically shown at FIG. 10. It comprises for each line of rails three analogic to digital converters 20,21,22 respectively associated to the detectors 5,15 and 16 transforming the analogic measuring signals delivered by these detectors in digital signals which are delivered to a micro-processor 23.

This micro-processor 23 receives further informations which are either introduced manually through an alpha-numeric keyboard 24 relative for example to the type of machine used, to the number of grinding units for each line of rails that it comprises, and to the capacity of metal withdrawal of the grinding wheels used as a function of the power of the motors driving these grinding wheels.

One introduces also through said alpha-numeric keyboard the datas defining the reference profile as well as the types of wearing off for each of these profiles as well as the reprofiling speed.

The micro-processor 23 determines as a function of the datas which are furnished to it and which have been enumerated hereabove for each reprofiling unit working on both lines of rails a digital control position signal Po and a power control signal Pu as well as a control signal V of the working speed of the vehicle.

Digital to analogic converters 27,28 convert these digital control signals Pu, Po in analogic control signals for each reprofiling unit 7,8. A digital to analogic converter 40 converts the digital control signal of the speed V in an analogic control signal.

FIG. 10 shows the feedback loop of a reprofiling unit, the number 1 unit of rail 11 of the track.

The position analogic signal Po$_1$ is compared in a comparator 29 to the output signal of an angle detector 30 indicating the angular position of the support 10, and thus of the grinding unit around the axis Y—Y parallel to the longitudinal axis of the rail. If there is no equality between the signal Po₁ and the one delivered by the angle detector 30, the comparator delivers a position correction signal ΔPo, positive or negative, controlling through the intermediary of an amplifier 31 a servo-valve 32 controlling the double-effect jack 13 which is fed in fluid under pressure by means of the hydraulic group 44 ensuring the angular positioning of the grinding unit 7,8.

The power analogic signal Pu₁ is compared by means of the comparator 33 to a signal proportional to the instantaneous power of the motor 7 and, in case of inequality of these signals, the comparator 33 delivers a power correction signal ΔPu controlling, through the intermediary of an amplifier 34 a servo-valve 35 controlling the double-acting jack 9,9a modifying the pressure of the grinding wheel 8 against the rail 11.

The speed analogic signal V delivered by the digital to analogic converter 40 fed by the micro-processor 23 is compared by means of a comparator 41 to a signal proportional to the speed of the traction motor 42 of the vehicle 3 and in case of inequality of these signals, the comparator 41 delivers a correction signal ΔF controlling through the intermediary of an amplifier 43 the electrical feeding frequency of the driving motor 42.

So, the described machine for using the reprofiling method comprises for each line of rails at least measuring means of the transverse profile of the rail, but generally also of the elapsed distance and of the longitudinal profile of the rail, of the undulations of great or small wavelength; comparison means of the types of wearing off deducted from the measured profile to a selected reference profile permitting to establish a reprofiling category which determines a configuration in position and power of each tool or reprofiling units. The comparison means of the measured profiles and reference profiles, as well as, the selecting means of the configuration, position and power, of the tools are in the example shown grouped in the micro-processor 23.

In the case of a machine such as the one described, the measurement of the short and long longitudinal waves of each rail permit the micro-processor to determine the reprofiling modes, light or aggressive, according to the amplitude of the undulations and free or locked according to the wavelength of these undulations. In the aggressive mode an over-power is added to the motor. In the free or unlocked mode each grinding unit is independent for the grinding of the short waves, whereas in locked mode several grinding units are fast together so as to increase the length of the reference base for the grinding of the long waves.

The scheme according to FIG. 10 is given by way of example, the power, position or speed feedback can be realized in different ways without using an analogic to digital converter. In the same manner the grinding electric motors can be replaced for example by hydraulic motors.

Finally, it is also to be noted that when at the end of a track portion another configuration of reprofiling tools is necessary for the next portion, in position as well as in power, this can be made in two different ways:

a. All the tools are displaced simultaneously from their old position to the new one.
b. The tools located in the direction of displacement of the machine are displaced the one after the other as a function of their displacement along the rail and of the speed of work, so that they all take their new position in the same point of the track. This avoids, for reprofiling machine of great length, leaving zones where the reprofiling is undetermined due to the spacing of the tools.

The example described concerns the reprofiling of rails by means of grinding, but it is evident that reprofiling tools other than grinding wheels may be used, such as milling cut oscillating blocs, abrasive belts and so on.

What we claim is:

1. A method of programming the reprofiling work of the rails of a railroad track, according to which the track is divided in a certain number of portions which comprises: carrying out the following operations for each of said portions:
   a. selecting among several reference profiles a preferred reference profile;
   b. determining a certain number of characteristical types of wearing off of the rail to be reprofiled among given different possible types of wearing off;
   c. selecting a type of reprofiling machine having to be used for the reprofiling among the types of machine at disposition, as well as the speed of working;
   d. defining standard tool configurations as well in position as in power;
   e. selecting as a function of the type of reprofiling machine to be used, the standard tool configurations which can be realized with said machine;
   f. measuring the wavelength and the amplitude of longitudinal undulations on the track portion envisaged;
   g. measuring a transverse profile of the head of the rail on the envisaged track portion;
   h. comparing the measured rail profile with the preferred reference profile and determining the excess of metal to be removed;
   i. comparing the measured transverse profile of the rail to the different possible types of wearing off and determining by this comparison a reprofiling category to be used which is representative for the considered portion;
   j. determining as a function of the representative reprofiling category the standard particular tool configuration to be used among the ones selected for the machine to be used;
   k. determining as a function of the particular tool configuration to be used, of the reprofiling category to be used, of the excess metal to be removed and of the longitudinal undulations amplitude, the total number of passes to be made; and
   l. entering data collected from the preceding steps into the selected reprofiling machine so as to have a thus programed machine.

2. A method according to claim 1, comprising the determination, as a function of the amplitudes and of the wavelengths of the longitudinal undulations of the rail, at least one reprofiling mode, a light one or an aggressive one, and with several grinding unit locked or free.

3. A method according to claim 1, further comprising: establishing for the track to be reprofiled a record of the track portions, of the speed assigned to the reprofiling machine for each of these portions, and of the number of machine passes for each of the said track portions, then using this record for the programming, as a function of the free intervals for making the work of reprofiling the rails of this track.

4. A method according to claim 3, further comprising: displaying all other parameters determined or measured for the programming of the reprofiling work or for the control of a reprofiling machine directly or in a deferred manner.

5. A method according to claim 3, further comprising: using the protocol of the record of the parameters relative to the track portion for the manual control of a reprofiling machine at a deferred time.

6. A method according to claim 1, in which the number of possible types of wearing off of the rail is five; a rail practically not worn; a flattened rail the sides of which are still good; a rail with an important outside burr, a rail with an outside burr and an inside chamfer; and a flat rail having outside and inside burrs.

7. A method according to claim 1, further comprising: controlling a reprofiling machine either directly or by means of a record of the speed of work, of the standard tool configuration to be used, of the reprofiling mode and of the total number of machine passes for each portion of the track.

8. A method according to claim 1, in which the change in tool configuration is controlled either simultaneously for all the tools or separately as a function of the advance of the machine so that this modification of configuration will take effect for all the tools at a same point of the track.

9. A machine for performing the programming of reprofiling work of the rails of a railroad track comprising: selection means of a preferred reference profile among several reference profiles which are memorized; means to determine among all the memorized and detected types of wearing off a certain number of characteristical types of wearing off of the worn rail to be reprofiled; means to define the speed of work; means to memorize all possible standard configurations of tools for this machine; means to measure the amplitude of the longitudinal undulations of the rails; means to measure a transverse profile of the head of the rail; comparison means of the worn rail profile with the preferred reference profile to determine the excess metal to be removed; comparison means of the measured transverse profile to the different characteristical types of wearing off of the rail to be reprofiled to determine a reprofiling category to be used; means determining as a function of the reprofiling category to be used, the particular standard tool configuration to be used; means determining as a function of the tool configuration to be used, of the reprofiling category to be used, of the excess of metal to be removed and of the amplitude of the longitudinal undulations, the total number of passes to be made.

10. A machine according to claim 9, which comprises control means of the tool configuration relative to each line of rails causing either a simultaneous modification of the configuration of all tools or a sequential modification of the tools relative to each line of rails as a function of the advance of the machine along the track.

11. A method of performing the reprofiling work of the rails of a railroad track, according to which the track is divided in a certain number of portions which comprises: carrying out the following operations for each of said portions:

a. selecting among several reference profiles a preferred reference profile;

b. determining a certain number of characteristical types of wearing off of the rail to be reprofiled among given different possible types of wearing off;

c. selecting a type of reprofiling machine having to be used for the reprofiling among the types of machine at disposition, as well as the speed of working;

d. defining standard tool configurations as well in position as in power;

e. selecting as a function of the type of reprofiling machine to be used, the standard tool configurations which can be realized with said machine;

f. measuring the wavelength and the amplitude of longitudinal undulations on the track portion envisaged;

g. measuring a transverse profile of the head of the rail on the envisaged track portion;

h. comparing the measured rail profile with the preferred reference profile and determining the excess of metal to be removed;

i. comparing the measured transverse profile of the rail to the different possible types of wearing off and determining by this comparison a reprofiling category to be used which is representative for the considered portion;

j. determining as a function of the representative reprofiling category the standard particular tool configuration to be used among the ones selected for the machine to be used;

k. determining as a function of the particular tool configuration to be used, of the reprofiling category to be used, of the excess metal to be removed and of the longitudinal undulations amplitude, the total number of passes to be made;

l. entering data collected from the preceding steps into the selected reprofiling machine so as to have a thus programed machine.

m. performing the reprofiling work of the rails using the programmed machine.

* * * * *